Patented July 17, 1928.

1,677,558

UNITED STATES PATENT OFFICE.

FERDINAND KELLER, OF OFFENBACH-MAIN-BURGEL, AND KARL SCHNITZSPAHN, OF OFFENBACH-ON-THE-MAIN, GERMANY, ASSIGNORS TO GRASSELLI DYESTUFF CORPORATION, OF NEW YORK, N. Y., A CORPORATION OF DELAWARE.

SOLID DIAZOSALTS OF ORTHO-AMINOPHENOLARYLETHERS.

No Drawing. Application filed February 11, 1927, Serial No. 167,581, and in Germany February 12, 1926.

This invention relates to new solid diazosalts of the general formula:

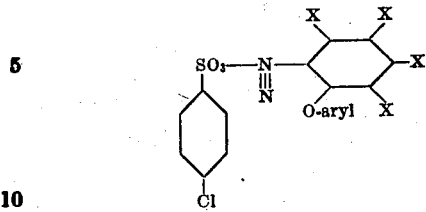

wherein the X's stand for hydrogen atoms, of which one or more may be replaced by a monovalent substituent and aryl represents an unsulfonated arylresidue, which diazosalts may be obtained by double decomposition reaction of mineral acid diazosalt solutions of ortho-aminodiphenylether and its unsulfonated substitution products, obtained in the customary manner and sufficiently concentrated, either with a para-chlorobenzene sulfonic metal salt or with free para-chlorobenzene sulfonic acid. The new salts separate from their solutions as crystalline whitish to yellowish to brownish colored precipitates and can be easily filtered and dried.

In U. S. Patent No. 1,629,906 stable diazosalts of ortho-aminophenolarylethers are described, which are obtained by treating the diazoderivatives of unsulfonated ortho-aminophenol aryl- and alkarylethers with arylsulfonic acids, particularly with mono- and polysulfonic acids of the naphthalene series and with nitrobenzene sulfonic acid.

In view of the fact, that the arylsulfonates on the one side and the various diazocompounds on the other side are strongly differentiated, when reacting with each other, it could not been foreseen, that the para-chlorobenzene sulfonic acid would be suitable for separating solid diazosalts of ortho-aminophenol arylethers, whereas the very similar benzene sulfonic acid is unfit for this purpose. In fact, however, the new para-chlorobenzene sulfonic diazosalts of ortho-aminophenolarylethers are distinguished by the capability of being readily separated and a good stability and the clearness of the shades they produce.

The new solid diazosalts are valuable diazosalts preparations for dyeing and printing. Under certain conditions it has been found advisable to add to the diazonium salt preparations such substances as are useful in dyeing processes.

The following examples are given to illustrate the invention, the parts being by weight:

Example 1.

A diazosolution, prepared from 278 parts of ortho-aminodiphenylether, 900 parts of hydrochloric acid of 15% and 255 parts of a solution, containing 40% of sodium nitrite, is stirred with 355 parts of para-chlorobenzene sulfonate of sodium, until the decomposition is finished. Then the separated diazosalt is filtered and dried at a moderate temperature. It is a brownish colored and well soluble powder, having probably the formula:

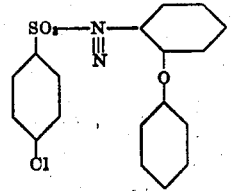

Example 2.

To a filtrated diazosolution, prepared from 110 parts of 4-chloro-2-amino-1-diphenylether, 950 parts of hydrochloric acid (density=1.05) and 185 parts of a solution, containing 40% of sodium nitrite, a concentrated aqueous solution of 116 parts of free para-chloro-benzene sulfonic acid is added. The separated diazosalt having probably the formula:

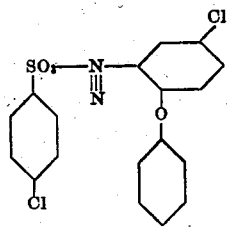

is then dried and mixed with 400 parts of the technical sodium salt of 1.6-naphthalene disulfonic acid. The mixture is a brownish and in water soluble powder.

The same good result is obtained when starting from other ortho-aminodiarylethers, substituted in one of the arylresidues or in both.

We claim:
1. As new compounds solid diazosalts of ortho-aminophenolarylethers of the general formula:

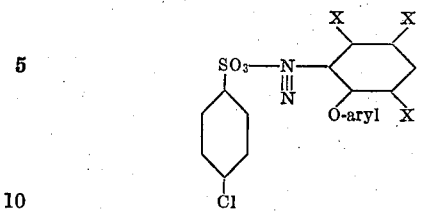

wherein the X's stand for hydrogen atoms, of which one or more may be replaced by chlorine and "aryl" represents an unsulfonated arylresidue, which diazosalts are whitish to yellowish to brownish colored and soluble powders, being substantially identical with products obtainable by double decomposition reaction of mineral acid diazosalt solutions of ortho-aminaphenolarylethers either with a para-chlorobenzene sulfonic metal salt or with free para-chlorobenzene sulfonic acid.

2. As new compounds solid diazosalts of ortho-aminophenolarylethers of the general formula:

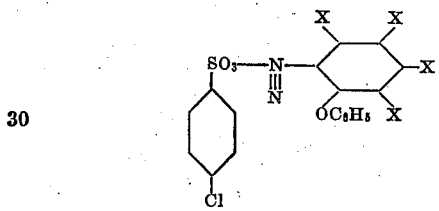

wherein the X's stand for hydrogen atoms, of which one or more may be replaced by chlorine, which diazosalts are whitish to yellowish to brownish colored and soluble powders being substantially identical with products obtainable by double decomposition reaction of mineral acid diazosalt solutions of ortho-aminophenolarylethers either with a para-chlorobenzene sulfonic metal salt or with free para-chlorobenzene sulfonic acid.

3. As new compounds solid diazosalts of ortho-aminophenolarylethers of the general formula:

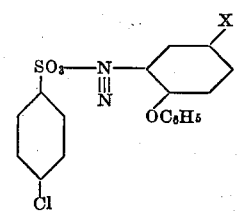

wherein X stands for hydrogen or chlorine which diazosalts are whitish to yellowish to brownish colored and soluble powders, being substantially identical with products obtainable by double decomposition reaction of mineral acid diazosalt solutions of a para-substituted ortho-aminophenolarylether either with a para-chlorobenzene sulfonic metal salt or with free para-chlorobenzene sulfonic acid.

4. As a new compound the solid diazosalt of para-chloro-ortho-aminodiphenylether of the probable formula:

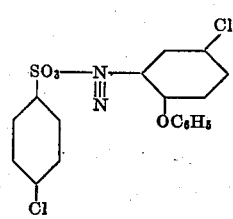

being a brownish colored and soluble powder and being substantially identical with a product obtainable by double decomposition reaction of mineral acid diazosalt solutions of para-chloro-ortho-aminodiphenylether either with a para-chlorobenzene sulfonic metal salt or with free para-chlorobenzene sulfonic acid.

In testimony whereof, we affix our signatures.

FERDINAND KELLER.
KARL SCHNITZSPAHN.